(12) United States Patent
Anderson et al.

(10) Patent No.: US 10,399,506 B2
(45) Date of Patent: Sep. 3, 2019

(54) CARGO CARRIER ASSEMBLY WITH HINGE MECHANISM

(71) Applicant: Horizon Global Americas Inc., Plymouth, MI (US)

(72) Inventors: Derek Anderson, Newbury, OH (US); Paul Mueller, Wadsworth, OH (US)

(73) Assignee: Horizon Global Americas Inc., Plymouth, MI (US)

( * ) Notice: Subject to any disclaimer, the term of this patent is extended or adjusted under 35 U.S.C. 154(b) by 0 days.

(21) Appl. No.: 15/596,682

(22) Filed: May 16, 2017

(65) Prior Publication Data
US 2017/0327053 A1    Nov. 16, 2017

Related U.S. Application Data

(60) Provisional application No. 62/336,909, filed on May 16, 2016.

(51) Int. Cl.
*B60R 9/10*  (2006.01)
*B60R 9/06*  (2006.01)

(52) U.S. Cl.
CPC . *B60R 9/10* (2013.01); *B60R 9/06* (2013.01)

(58) Field of Classification Search
CPC .................................. B60R 9/06; B60R 9/10
USPC ......................................................... 224/509
See application file for complete search history.

(56) References Cited

U.S. PATENT DOCUMENTS

| | | |
|---|---|---|
| 3,240,406 A | 3/1966 | Logan |
| 3,529,737 A | 9/1970 | Daugherty |
| 3,951,434 A | 4/1976 | Sause |
| 4,084,736 A | 4/1978 | Jacobs |
| 4,575,112 A | 3/1986 | Tremblay |
| 4,702,401 A | 10/1987 | Graber |
| 4,844,497 A | 7/1989 | Allen |
| 4,875,608 A | 10/1989 | Graber |
| 4,991,865 A | 2/1991 | Francisco |
| 5,011,176 A | 4/1991 | Eppinette |
| 5,067,742 A | 11/1991 | Relja |
| 5,100,349 A | 3/1992 | Perkins |

(Continued)

FOREIGN PATENT DOCUMENTS

| | | |
|---|---|---|
| EP | 0943495 | 9/1999 |
| GB | 2425997 | 11/2006 |

OTHER PUBLICATIONS

International Searching Authority—European Patent Office, International Search Report and Written Opinion of International application No. PCT/US2017/032903, dated Jul. 6, 2017, 13pp.

(Continued)

*Primary Examiner* — Peter N Helvey
(74) *Attorney, Agent, or Firm* — McDonald Hopkins LLC

(57) ABSTRACT

The present disclosure includes a hinge mechanism for a cargo accessory as shown and described. The hinge mechanism may include a linkage selectively attachable to a vehicle, and a cargo accessory carrying member pivotally attached to the linkage, where the cargo accessory carrying member is capable of being pivoted between a straight position, an upward position, and a drop position. The hinge mechanism may also include a guide member and guide apertures wherein the guide member may be selectively positioned within the guide apertures permitting pivoting of the cargo accessory carrying member relative to the linkage.

19 Claims, 13 Drawing Sheets

(56) References Cited

U.S. PATENT DOCUMENTS

| | | |
|---|---|---|
| 5,288,095 A | 2/1994 | Swindall |
| 5,303,857 A * | 4/1994 | Hewson ............... B60R 9/06 |
| | | 224/282 |
| 5,322,315 A | 6/1994 | Carsten |
| 5,445,300 A | 8/1995 | Eipper |
| 5,527,055 A | 6/1996 | Breslin |
| 5,529,231 A | 6/1996 | Burgess |
| 5,570,825 A | 11/1996 | Cona |
| 5,624,129 A | 4/1997 | Clark |
| 5,658,119 A * | 8/1997 | Allsop ............... B60R 9/06 |
| | | 224/536 |
| 5,685,686 A * | 11/1997 | Burns ............... B60R 9/06 |
| | | 224/282 |
| 5,730,345 A * | 3/1998 | Yeckley ............... B60R 9/06 |
| | | 224/505 |
| 5,820,002 A | 10/1998 | Allen |
| 6,047,869 A | 4/2000 | Chiu |
| 6,053,336 A | 4/2000 | Reeves |
| 6,068,281 A | 5/2000 | Szczypski |
| 6,170,852 B1 | 1/2001 | Kimbrough |
| 6,244,483 B1 | 6/2001 | Mclemore |
| 6,439,397 B1 | 8/2002 | Reeves |
| 6,491,195 B1 * | 12/2002 | McLemore ............... B60R 9/06 |
| | | 224/521 |
| 6,523,731 B1 | 2/2003 | Pedrini |
| 6,644,525 B1 | 11/2003 | Allen |
| 6,655,562 B2 * | 12/2003 | Jeong ............... B60R 9/06 |
| | | 224/282 |
| 6,736,301 B1 | 5/2004 | Huang |
| 6,752,303 B2 | 6/2004 | Mclemore |
| 6,761,297 B1 | 7/2004 | Pedrini |
| 6,789,815 B2 | 9/2004 | Moss |
| 6,968,986 B1 | 11/2005 | Lloyd |
| 7,108,140 B2 * | 9/2006 | Whitnall ............... B60R 9/06 |
| | | 211/195 |
| 7,240,816 B2 | 7/2007 | Tsai |
| 7,658,569 B2 | 2/2010 | De Oliveira |
| 7,703,804 B2 | 4/2010 | Cymbal |
| 7,815,083 B2 | 10/2010 | Clausen |
| 7,832,607 B2 * | 11/2010 | Clausen ............... B60R 9/10 |
| | | 224/502 |
| 2006/0029483 A1 | 2/2006 | Allen |
| 2011/0011909 A1 | 1/2011 | Liu |
| 2015/0021371 A1 | 1/2015 | Ward |
| 2015/0217703 A1 | 8/2015 | Deming |
| 2016/0068110 A1 | 3/2016 | Prescott |
| 2016/0068111 A1 | 3/2016 | Walker |

OTHER PUBLICATIONS

International Searching Authority—European Patent Office, International Search Report and Written Opinion of International application No. PCT/US2015/048874, dated Feb. 9, 2016, 15pp.

\* cited by examiner

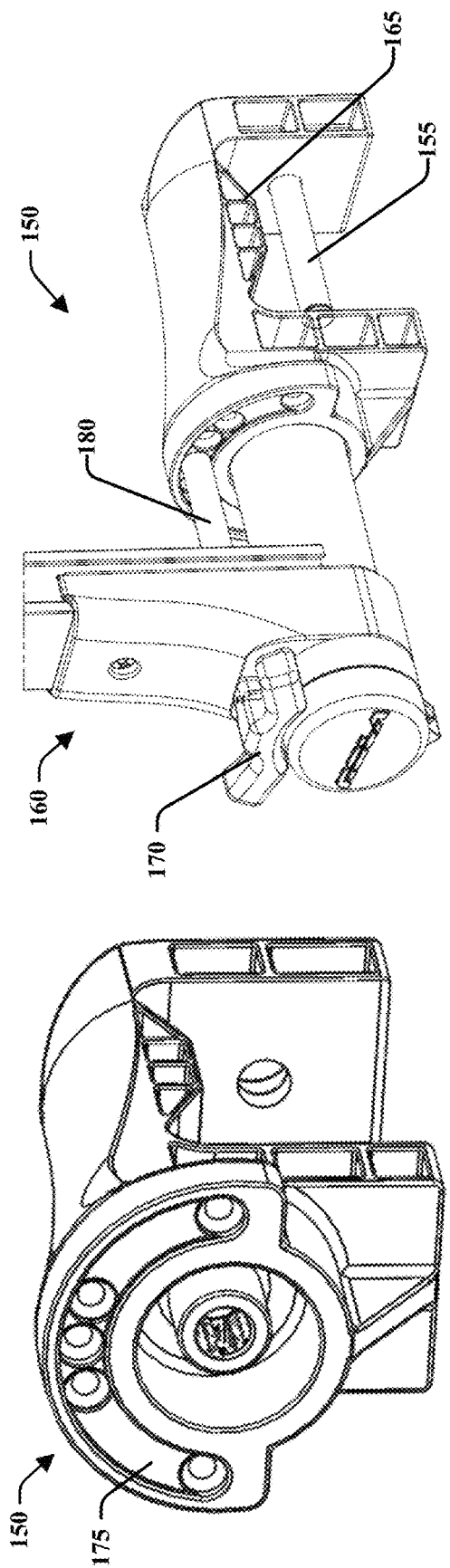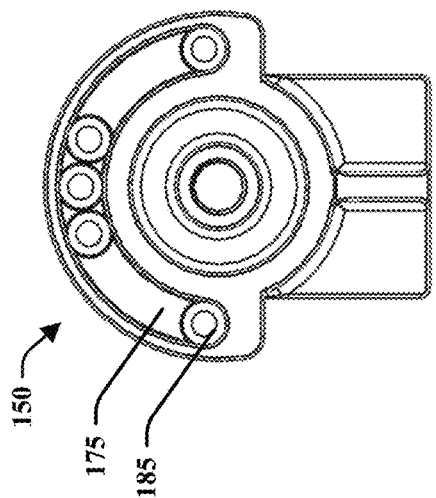
FIG. 8A
FIG. 8B
FIG. 8C

CARGO CARRIER ASSEMBLY WITH HINGE MECHANISM

CROSS-REFERENCE TO RELATED APPLICATIONS

This application claims the benefit from Provisional Patent Application No. 62/336,909 entitled "CARGO CARRIER ASSEMBLY WITH HINGE MECHANISM" filed on May 16, 2016 and is hereby incorporated by reference in its entirety.

TECHNICAL FIELD

The present invention relates to a cargo carrier and more particularly, to hitch mounted type cargo carrier that includes a hinge mechanism for pivoting and supporting the carrier in position behind a vehicle.

BACKGROUND

Cargo carrier equipment may include various configurations of rail members, arms, and fasteners designed to assist a user to stabilize cargo such as a bicycle on a vehicle for storage or transport. Conventional cargo carrier equipment can be roof mounted, strap mounted or hitch mounted to the vehicle. These carriers include various fastening systems to secure the carrier to the vehicle.

A disadvantage of hitch mounted carriers, however, is that they are generally bulky and take up a lot of space of the rear portion of the vehicle. Additionally, many of these carriers provide insufficient support to the cargo, such as a bicycle, which may require several points of contact for a secured attachment. Additionally, hitch mounted carriers for multiple bicycles take up a large relative amount of space that is undesirable for the user when the carriers are not being utilized to transport or store bicycles.

The hitch-mounted carriers that extend from the rear of a vehicle, however, often result in making the vehicle more difficult to park, maneuver, and the like. This may result in the carriers needing to either be moved or removed from the vehicle in order to park, effectively maneuver the vehicle, or access trunk space or rear cargo. This, however, can be time consuming and may require the carrier to be stored, which may not be feasible and is not likely preferred.

Current hitch-mounted carriers often are limited as they may not be configured to be pivoted between an in use position and a storage position. There are known bike carriers that are configured with vertical mast frames configured in an upright position that may be tilted between a support position and a loading position such as known by U.S. Pat. No. 5,529,231 to Burgess and U.S. Pat. No. 6,644,525 to Allen. However, these vertical mast type bike carriers support the bikes from a top portion of the bike frame in which the bikes are susceptible to increased damage during transport and tilting of the carrier frames. In these instances, mounted bikes may impact one another as the carrier frames are tilted.

Alternatively, some cargo management systems are capable of being re-positioned while remaining secured to the vehicle. These systems, however, often require the user to go between the cargo management system and the vehicle to re-position the cargo management system, which is often difficult to do. Further, these systems are often very difficult to re-position, require more than one person to re-position, or require the removal of the system from the vehicle before being re-positioned.

Further, various platform type cargo and bike carriers may be provided that include hinge mechanisms that may rattle or are too cumbersome to pivot or rotate with bikes positioned thereon.

Previously known bike carriers suffer from disadvantages that make it inconvenient for a user to transport, store, and pivot at least one bicycle onto them. Therefore, there is a need for a cargo carrier that is capable of transporting and storing cargo that is easy to configure in a more compact position during non-use and to allow access to a rear of the vehicle without further risking damage to the cargo. In view thereof, there exists a need for a hitch-mounted carrier of such design that it affords a solution that overcomes the disadvantages of previously known carriers.

SUMMARY

The present disclosure includes a bike carrier assembly with a hinge mechanism attachable to the rear of a vehicle. The assembly includes a hitch bar to connect to the vehicle and a carrier member to support at least one bike thereon. A hinge mechanism is attached to the hitch bar and carrier member and includes a bracket with a contoured path to receive a pin attached to the carrier member to allow the carrier member to be pivoted between an upward position, a straight position, and a lower position. A fulcrum bracket may be rotatably attached to the hitch bar and the carrier member to support the carrier member as it is rotating and positioned in place. In one embodiment, the pin may include a locking feature such as a spring loaded feature to assist with locking the carrier member in position along the contoured path.

Additionally, the bike carrier may attach to a hitch receiver, which is attached to an associated vehicle. The hitch receiver often attaches to the frame of the vehicle and may extend immediately below the bumper of the vehicle from the rear thereof. The bike carrier may be attached to a hinge mechanism that includes a draw bar that can be selectively attached to the hitch receiver and secured to the vehicle. The hinge mechanism may be configured to tilt the bike carrier from an in-use position to a storage position.

In another embodiment, the bike carrier can include a support arm that supports additional bike carriers in a generally scalable arrangement such that a plurality of bike carriers can extend from the hinge mechanism and tilt from the in-use position into the storage position.

The present disclosure includes a hinge mechanism for a cargo accessory as shown and described. The hinge mechanism may include a linkage selectively attachable to a vehicle, and a cargo accessory carrying member pivotally attached to the linkage, where the cargo accessory carrying member is pivotable between a straight position, an upward position, and a drop position. The hinge mechanism may also include a guide member and guide apertures wherein the guide member may be selectively positioned within the guide apertures permitting pivoting of the cargo accessory carrying member relative to the linkage.

DESCRIPTION OF THE DRAWINGS

The operation of the invention may be better understood by reference to the following detailed description taken in connection with the following illustrations, wherein:

FIG. 8A is a perspective view of an embodiment of a connection member of a bike carrier assembly separate from the cargo carrier assembly of the present disclosure;

FIG. 8B is a perspective view of an embodiment of the connection member of the bike carrier assembly separate from the cargo carrier assembly of the present disclosure;

FIG. 8C is a front view of connection member of FIG. 8A of the present disclosure;

DETAILED DESCRIPTION

Reference will now be made in detail to exemplary embodiments, examples of which are illustrated in the accompanying drawings. It is to be understood that other embodiments may be utilized and structural and functional changes may be made. Moreover, features of the various embodiments may be combined or altered. As such, the following description is presented by way of illustration only and should not limit in any way the various alternatives and modifications that may be made to the illustrated embodiments.

FIGS. 1-4 illustrates a cargo carrier 10 that may include an adjustable and scalable configuration adapted to support a cargo 12 thereon. The cargo carrier 10 may be selectively attachable to a hitch of a vehicle (not shown) in any appropriate manner. The cargo may be a bicycle or a plurality of bicycles that may be attached to the carrier 10 in any known or future developed configuration. The cargo 12 may also be a basket, rack, pod, bicycle rack, cooler accessory, tool box or a holder for any one of these items. As a means of an example, the cargo 12 may be attached to the carrier 10 as disclosed by commonly owned U.S. Utility patent application Ser. No. 14/847,443 titled "BIKE CARRIER" which filed on Sep. 5, 2015 which is incorporated by reference in its entirety. As such, the cargo 12 may be a platform type bike carrier assembly as illustrated by FIGS. 5-9. Further, commonly owned U.S. Utility patent application Ser. No. 14/237,273 titled "CARGO ACCESSORY FOLDING MECHANISM" filed on Oct. 7, 2014 discloses a linkage assembly for a folding mechanism used for basket type cargo accessory and is also hereby incorporated by reference in its entirety.

Here, the cargo carrier 10 may be attached to a hitch receiver that may be secured to a rear portion of a vehicle in any appropriate manner. In these embodiments, the cargo carrier 10 may include a draw bar 20 that may be capable of selectively attaching to the hitch receiver of the vehicle at any appropriate position such that the cargo carrier 10 may extend from the rear of the vehicle.

The draw bar 20 of the cargo carrier 10 may be capable of selectively engaging the hitch receiver in any appropriate manner. By way of a non-limiting example, the draw bar 20 may include at least one aperture that may be capable of generally aligning with a pin accepting aperture of the hitch receiver upon insertion of the draw bar 20 into the hitch receiver. Upon such insertion a hitch pin may be inserted into and through the hitch receiver pin accepting aperture and through the aperture, which may selectively secure the cargo carrier 10 with the hitch receiver. These configurations are exemplary embodiments and not all-inclusive nor exclusive. Any appropriate hitching system, mechanism or other means of attachment to the vehicle may be used without departing from the present teachings.

Figure 1:
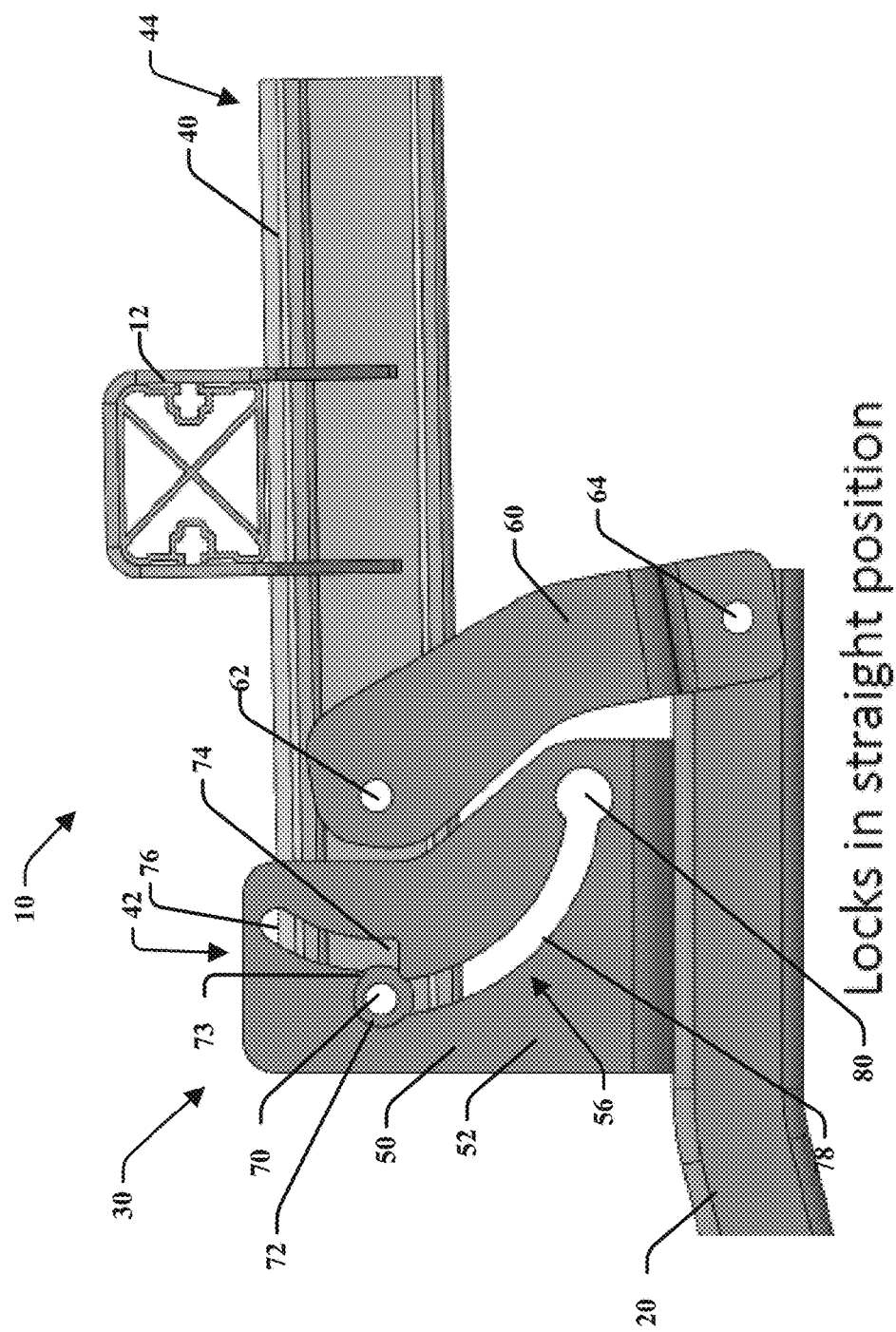
FIG. 1 is a side view of an embodiment of a hinge mechanism for a cargo carrier assembly of the present disclosure in a generally straight position.
Figure 2:
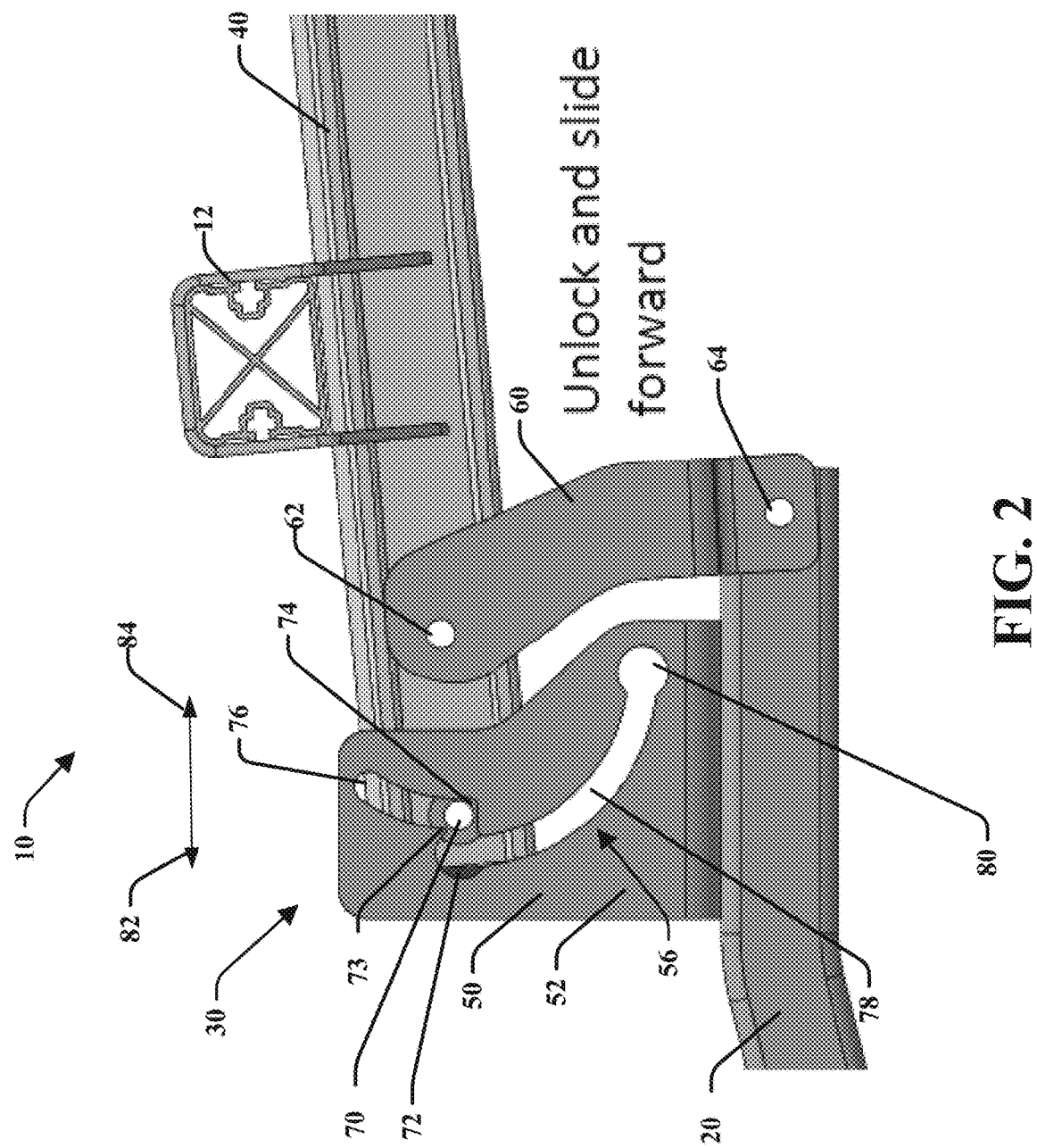
FIG. 2 is a side view of an embodiment of the hinge mechanism for a cargo carrier assembly of the present disclosure in an unlocked position.
Figure 3:
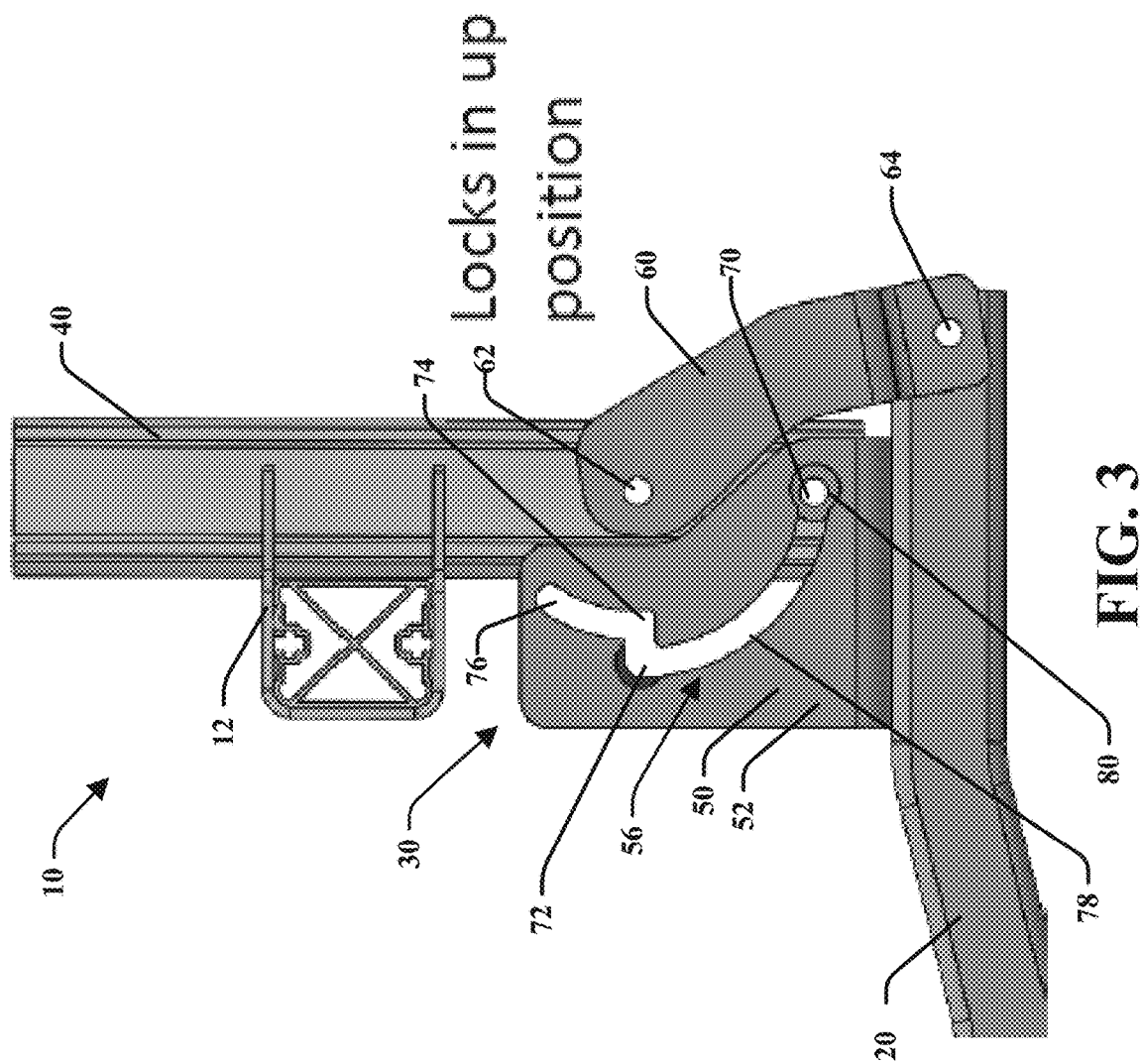
FIG. 3 is a side view of an embodiment of the hinge mechanism for a cargo carrier assembly of the present disclosure in an up position.
Figure 4:
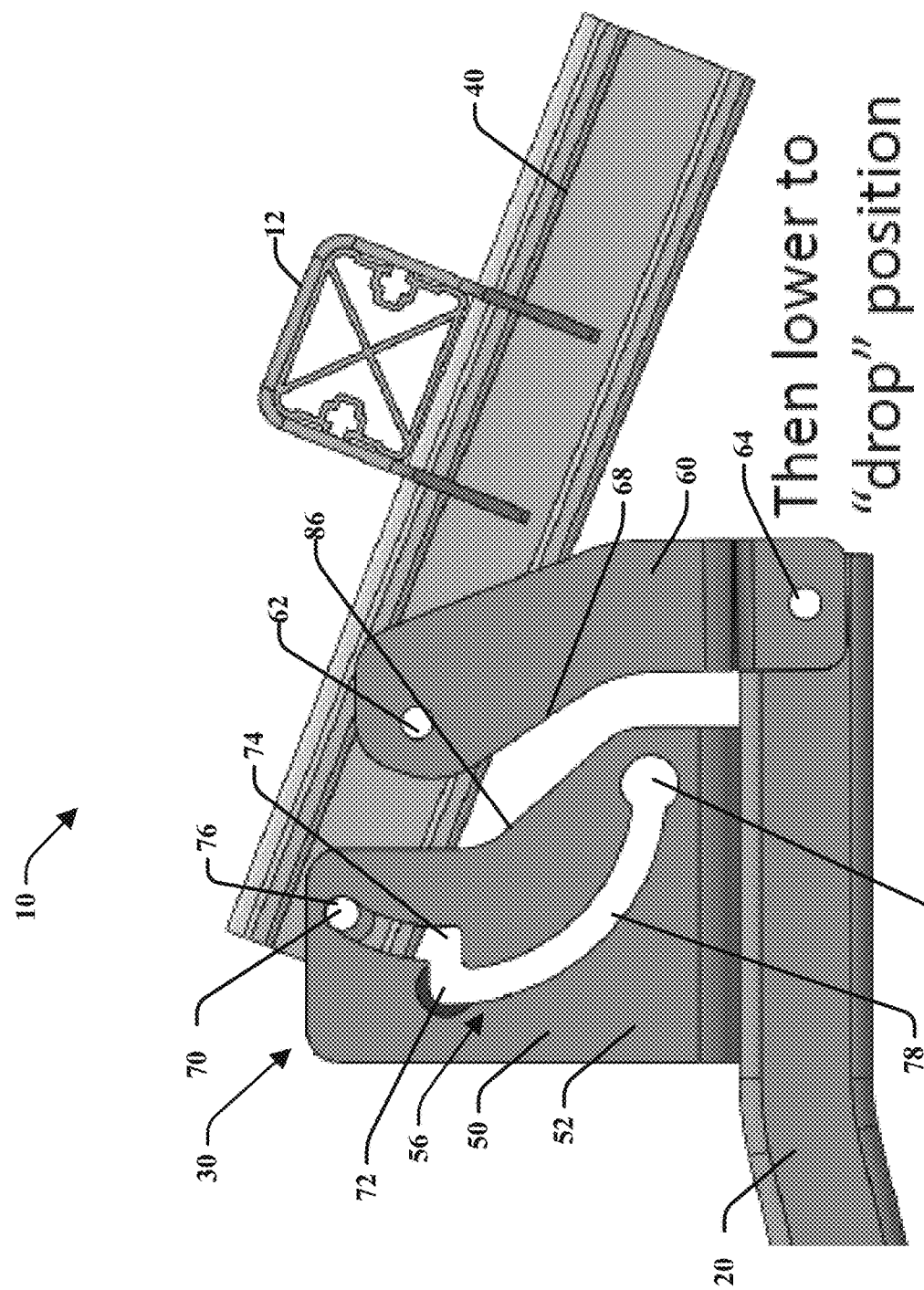
FIG. 4 is a side view of an embodiment of the hinge mechanism for a cargo carrier assembly of the present disclosure in a drop position.

As illustrated by FIGS. 1-4, the carrier 10 may include a hinge mechanism 30 which may permit the cargo 12 to be selectively positioned between various positions as will be described in more detail below. By way of a non-limiting example, the hinge mechanism 30 may permit the cargo 12 to be selectively pivoted between a substantially straight position (FIG. 1), an unlocked position (FIG. 2), substantially up or vertical position (FIG. 3), and a drop position (FIG. 4). These positions may be relative to the draw bar 20 or the hitch receiver of the vehicle.

The hinge mechanism 30 may be attached to the draw bar 20 and pivotally attached to a carrier member such as a tubular member 40. The carrier member 40 may extend from the hinge mechanism 30 and attach to the cargo 12 in any appropriate manner. The hinge mechanism 30 may include a linkage device 50, at least one pivot arm 60, and a guide member 70. The carrier member 40 may include a distal end 42 and a proximal end 44 wherein the distal end 42 may be attached to the hinge mechanism 30 and the proximal end 44 extends away from the hinge mechanism 30.

The distal end 42 of the carrier member 40 may be operatively secured to the linkage device 50. The linkage device 50 may be operatively secured to the carrier member 40 in any appropriate manner and may be secured with the draw bar 30 in any appropriate manner. In a non-limiting example, the linkage device 50 may include first and second plates 52, 54 spaced from one another—the first and second plates 52, 54 may extend generally parallel one another. The carrier member 40 may be pivotally secured between the first and second plates, 52, 54 in any appropriate manner. The first and second plates 52, 54 may also be attached to the draw bar 20 such as through using fasteners, welds or other appropriate manner to fixedly secure the linkage device 50 with the draw bar 20.

In some embodiments, the first and second plates 52, 54 may be secured to the carrier member 40 such that the first and second plates 52, 54 are positioned substantially parallel to each other. See FIG. 5B.

Further, a first pivot arm 60 may be attached to the carrier member 40 at a first pivot point 62. More specifically, the first pivot arm 60 may be pivotally attached to carrier member 40 at the first pivot point 62 and be pivotally attached to the draw bar 20 at a second pivot point 64. Alternatively, the second pivot point 64 could also be located on the linkage device 50 depending on the geometric configuration. The pivot arm 60 may provide structural support to the carrier member 40 as the carrier member 40 is pivoted relative to the hinge mechanism 30 or draw bar 20. The pivot arm 60 may allow the carrier member 40 to pivot relative to the first and second plates 52, 54. In some embodiments, the pivot arm 60 may include a fastener that may extend through the carrier member 40 to create the first pivot point 62 and a fastener that may extend through the draw bar 20 to create the second pivot point 64. This configuration may allow the carrier member 40 to pivot in a guided manner relative to the first and second plates 52, 54. Optionally, a second pivot arm may be provided along an opposite side of the carrier member 40 as the first pivot arm 60 wherein the first pivot arm 60 and the second pivot arm may be connected to one another with a bracket 69 (see FIG. 5A). The pivot arms 60 may include a contoured surface 68 that may nest with a contoured surface 86 of the linkage device 50 as the carrier member 40 is pivoted between various positions. These contoured surfaces 68 provide a freedom of movement that allows for mechanical advantage as the carrier member 40 is pivoted relative to the draw bar 20. This nested configuration allows for stable movement that reduces wobbling or vibrations during pivoting motion.

The hinge mechanism 30 may further include a guide member 70. The guide member 70 may be an elongated pin or other member that protrudes from the sides of the carrier member 40. By way of a non-limiting example, the guide member 70 may be moveably engaged with the linkage device 50 and more specifically may be moveably engaged with the first and second plates 52, 54. For example, the guide member 70 may extend through the carrier member 40 as well as guide apertures 56, 58 that are formed within the first and second plates, 52, 54, respectively.

The guide apertures 56, 58 may be slots formed in a particular configuration to allow the guide member 70 to be moved to various positioned along the slots as the carrier member 40 is pivoted between various positions as desired. The guide apertures 56, 58 may be elongated in shape and include a width that may allow the guide member 70 to slide within the guide apertures. The guide apertures 56 may be integrally formed in the first and second plates 52, 54 or alternatively may be formed therein through a subsequent operation, such as machining. The guide apertures 56, 58 may be of any appropriate shape and size. The guide apertures 56, 58 may include a straight position groove 72, an unlock position groove 74, a drop position groove 76, a rotational groove 78, and an upward position groove 80. These various groove shapes may be a generally continuous shape within the guide apertures 56 along each of the first and second plates 52, 54, respectively. A protrusion 73 may extend between the straight position groove 72 and the unlock position groove 74 to allow the guide member 70 and carrier member 40 to be maintained in the straight position. The shape of the contoured surfaces 68 of the pivot arms 60 and the contoured surface 86 of the linkage device 50 as well as the shape of the guide apertures 56, may provide the pivotal range of motion or freedom of movement that allows for mechanical advantage as the carrier member 40 is pivoted relative to the draw bar 20. The nested configuration of the pivot arms 60 and linkage device 50, and distance between the guide member 70 and pivot points 62, 64, may allow for stable movement that reduces wobbling or vibrations during pivoting motion.

In some embodiments, the guide apertures 56 may be of a shape and size such that the guide member 70 may be positioned therethrough. Still further, in some embodiments, the guide apertures 56, 58 may be of generally a same size as one another. In other embodiments, at least one of, the guide apertures 56 may be of a generally different size. The present teachings are not limited to such, but include any combination of approaches disclosed or to any appropriate configuration. While the guide apertures 56, 58 are shown in both the first and second plates 52, 54 the present teachings are not limited to such. In some embodiments only one of the first or second plates 52, 54 may include the guide aperture 56. In other embodiments the guide apertures may be a slot or slots formed within an interior surface of the plates 52, 54 in which the guide member 70 moveable engages therein.

The linkage device 50 may include the guide member 70 as noted above. The guide member 70 may extend through the first and second plates 52, 54 and through the carrier member 40. The guide member 70 may be selectively positionable between the straight position groove 72, the unlock position groove 74, the drop position groove 76, the rotational groove 78, and the upward position groove 80. In a non-limiting example, a user may be able to manually manipulate the carrier member 40 to pivot the carrier member 40 between the straight position (FIG. 1), the unlocked position (FIG. 2), the drop position (FIG. 4) and the upward position (FIG. 3). See also FIG. 7A—upward position, 7B—unlocked position, and 7C—drop position. More specifically, the guide member 70 may be selectively positioned from and to the straight position groove 72, the unlock position groove 74, the drop position groove 76, the rotational groove 78, and the upward position groove 80 as the carrier member 40 pivots at the first pivot point 62 and the second pivot point 64. Additionally, as illustrated by FIGS. 3 and 4, the contoured surface 68 of the pivot arm 60 may nest with the contoured surface 86 of the linkage device 50 as the carrier member 40 is pivoted between various positions. This may then allow the hinge mechanism 30 to move the cargo 12 between the substantially straight position, the upward position, and the drop position.

As illustrated by FIG. 2, the guide member 70 may be positioned from the straight position groove 72 to the unlock position groove 74 by translating the carrier member 40 in a first direction 82 to lock the carrier member 40 in the straight position. In addition or in the alternative, the guide member 70 may be positioned from the straight position groove 72 to the unlock position groove 74 by translating the carrier member 40 in a second direction 84 to unlock the carrier member 40. The first direction 82 may be generally opposite from the second direction 84 and the first and second directions 82, 84 may be generally parallel to the draw bar 20. The shaped protrusion 73 may extend between the straight position groove 72 and the unlock position groove 74 wherein the guide member 70 may have to overcome the protrusion 73 to pivot or translate between the straight position groove 72 and the unlock position groove 74. The guide member 70 and carrier member 40 may pivot towards the drop position when placed in the unlocked position. Also, the protrusion 73 may require the user to slightly pivot the carrier member 40 upwardly to allow the guide member 70 to overcome the protrusion and translate between the straight position groove 72 and the unlock position groove 74. Further, as illustrated by FIGS. 5A, 5B, 6, 7A, 7B, and 7C, the hinge mechanism 30 may include a locking member 130 that includes an internal mechanism for preventing the guide member 70 from pivoting towards the rotational groove 78 and drop position groove 80. The locking member 130 may include a paddle or switch that may be toggled by a user between a locked or unlocked position as the guide member 70 is positioned in the straight position groove 72. The locking member 130, positioned in the locked position, may prevent the guide member 70 from pivoting towards the rotational groove 78. The locking member 130, positioned in the unlocked position, may allow the guide member 70 to pivot towards the rotational groove 78. In one embodiment, the protrusion 73 and the locking member 130, in the locked position, may maintain the guide member 70 in the straight position groove 72. In another embodiment, the locking member 130, in the unlocked position, allows the guide member 70 to translate between the straight and unlock position groove 72, 74, as well as pivot between the straight and rotational groove 72, 78.

As the carrier member 40 may be operatively secured with the guide member 70, the guide member 70 may be positioned from either of the straight position groove 72, the unlock position groove 74, the drop position groove 76, the rotational groove 78 and the upward position groove 80. Doing so may allow the pivot arm 60 of the hinge mechanism 30 to pivot around pivot points 62 and 64 between the generally straight position, the generally upward position, the drop position and back to the generally straight position. The pivoting motion may be completed manually with a user's support as the pivot arm 60 provides added mechanical advantage for a generally controlled pivoting motion. The guide member 70 being positioned in straight position groove 72 of the guide apertures 56 may generally lock the hinge mechanism 30 in the generally straight position whereas the guide member 70 being positioned in the drop position groove 76 may generally lock the hinge mechanism 30 in the drop position. Similarly, the guide member 70 being positioned in the upward position groove 80 may generally lock the hinge mechanism 30 in the upward position.

The hinge mechanism 30 may operate by translating the carrier member 40 to cause the guide member 70 to release from either of the straight position groove 72, the unlock position groove 74, the drop position groove 76, the rotational groove 78, and the upward position groove 80. By way of a non-limiting example, the cargo 12 may pivot from a substantially straight position to a substantially upward position or to a drop position. Notably, when in the drop position, a user may access the trunk portion of the vehicle with reduced interference from the bicycles or other cargo stored on the cargo assembly 10.

The guide member 70 pay be positioned at a fixed distance away from the first pivot point 62 along the carrier member 40. This may allow the pivoting action of the hinge mechanism 30 to be structurally stable and provide ease of use for a single person to pivot the cargo secured thereon.

The cargo accessory 10 depicted in FIGS. 5-11 may be capable of selectively supporting a plurality of bicycles to the vehicle for storage or transport. The cargo accessory may include at least one bike carrier assembly 100—although any number of bike carrier assemblies may be used without departing from the present teachings. By way of non-limiting examples, one, two, three or more bike holders may be used. Still further, any kind of accessory attaching device may be used without departing from the present teachings.

Figure 5B:
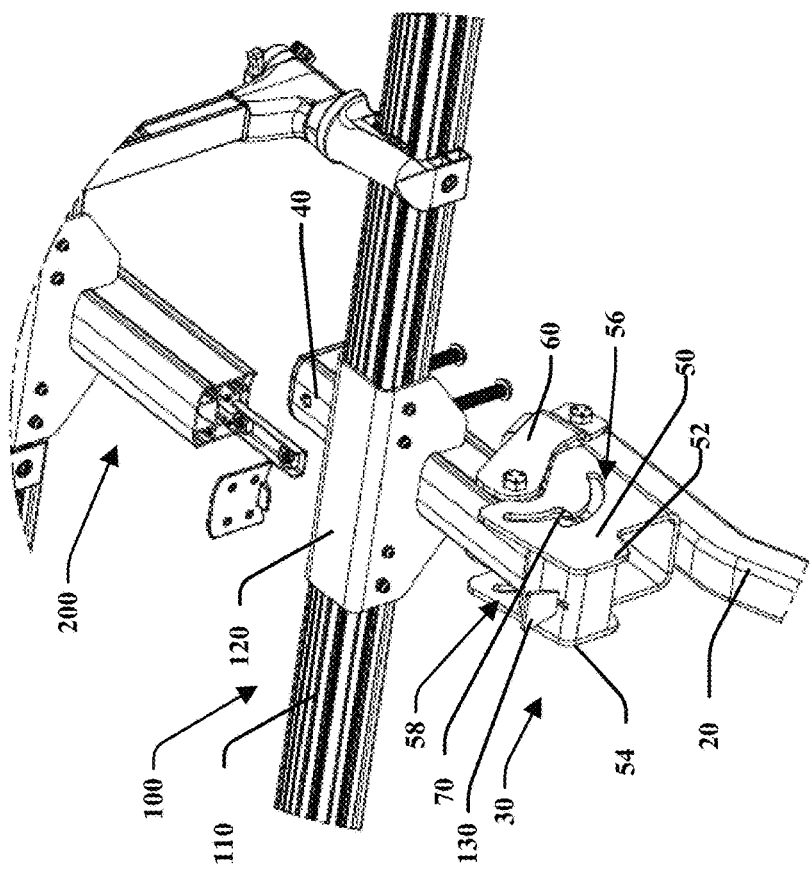
FIG. 5B is a an exploded perspective view of a top side of the hinge mechanism of the present disclosure.
Figure 5A:
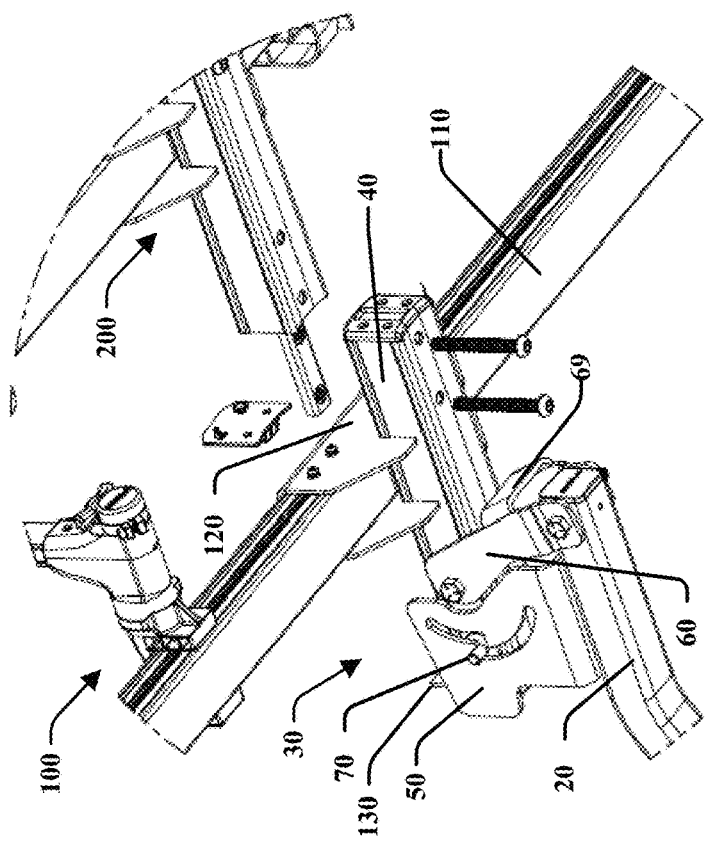
FIG. 5A is an exploded perspective view of an underside of the hinge mechanism of the present disclosure.

FIGS. 5A and 5B illustrate the hinge mechanism 30 with a first bike carrier 100 attached to the carrier member 40 and a second bike carrier 200 that may be attached to the carrier member 40. The first bike carrier 100 may include a rail 110 attached to the carrier member 40 with a bracket 120. The rail 110 may be in a generally perpendicular orientation relative to the carrier member 40 such that any bike may be placed with each wheel aligned with the rail 110.

Figure 6:
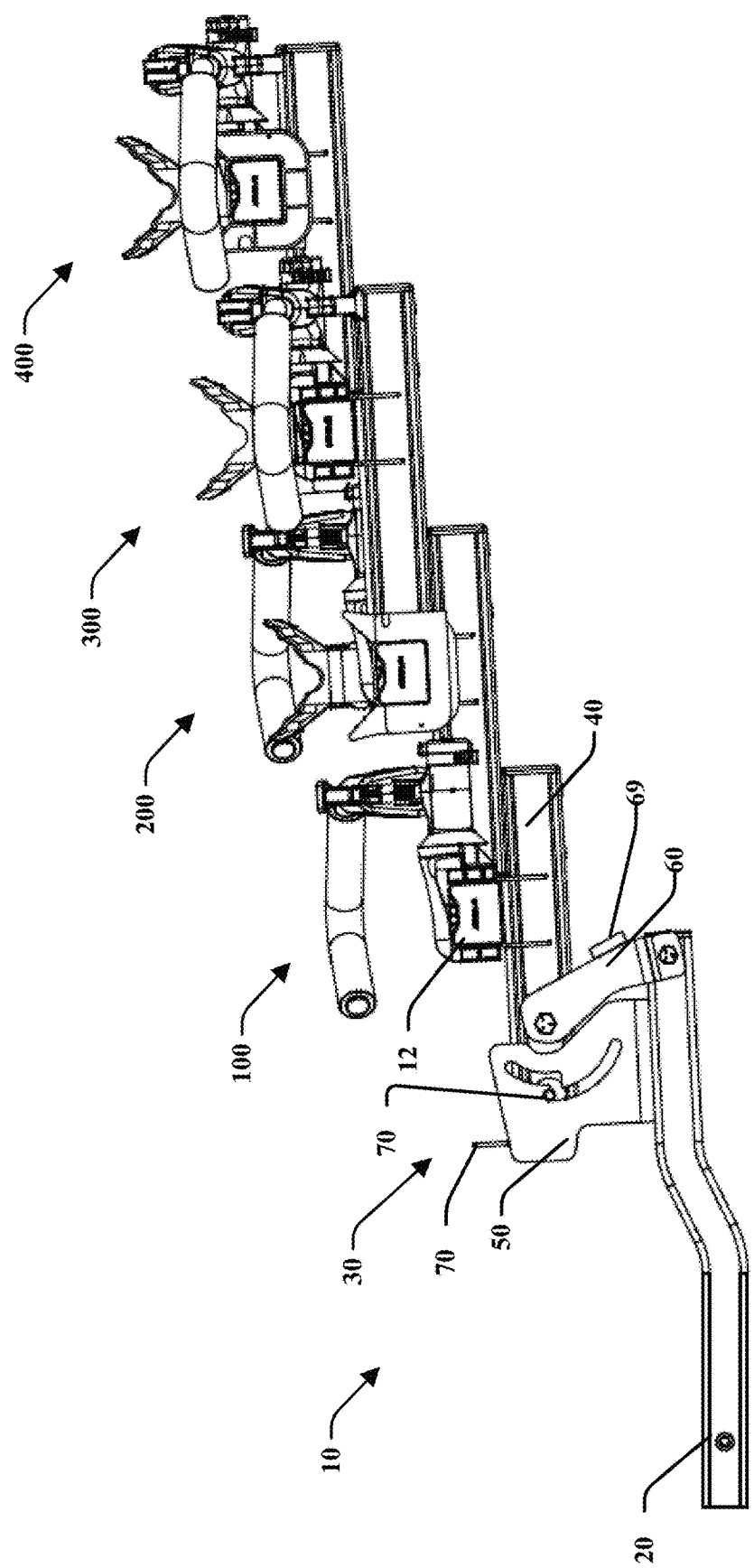
FIG. 6 is a side view of an embodiment of the hinge mechanism for a cargo carrier assembly of the present disclosure in a straight position.

FIG. 6 is a side view of an embodiment of the hinge mechanism 30 as it is attached to the first bike carrier 100, the second bike carrier 200, a third bike carrier 300, and a fourth bike carrier 400. Each of these bike carriers may include a carrier member attached to a subsequent carrier member and/or rail of the other bike carrier. This arrangement allows for a terraced or stepped orientation.

Figures 7A, 7B, 7C:
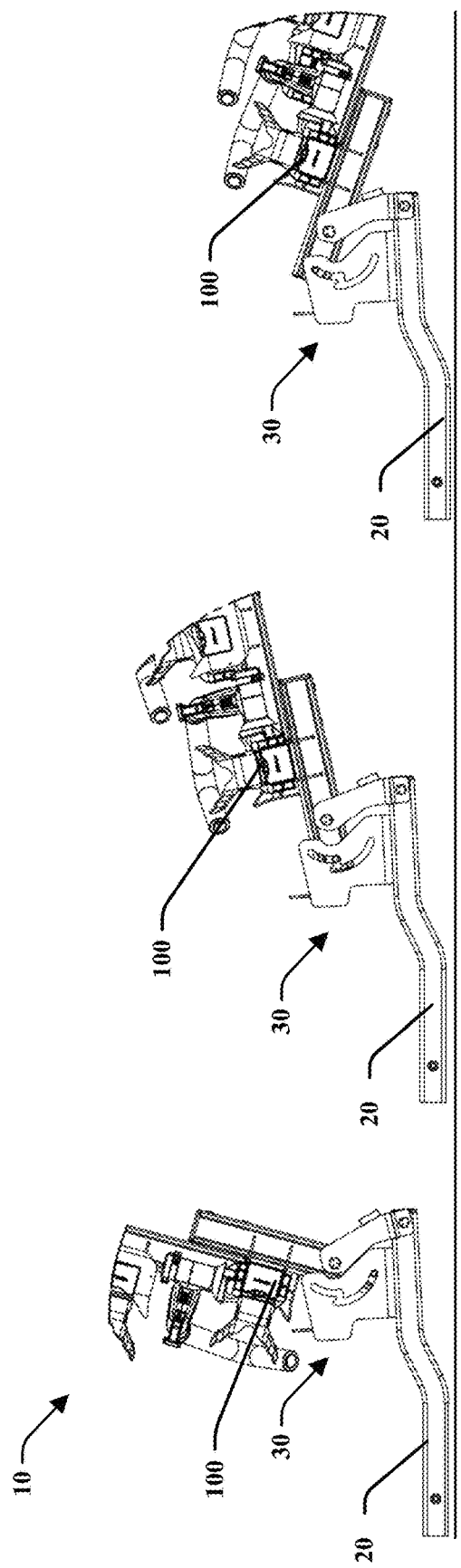
FIG. 7A is a side view of an embodiment of the hinge mechanism for a cargo carrier assembly of the present disclosure in an up position.
FIG. 7B is a side view of an embodiment of the hinge mechanism for a cargo carrier assembly of the present disclosure in an unlocked position.
FIG. 7C is a side view of an embodiment of the hinge mechanism for a cargo carrier assembly of the present disclosure in a drop position.
Figure 9A:
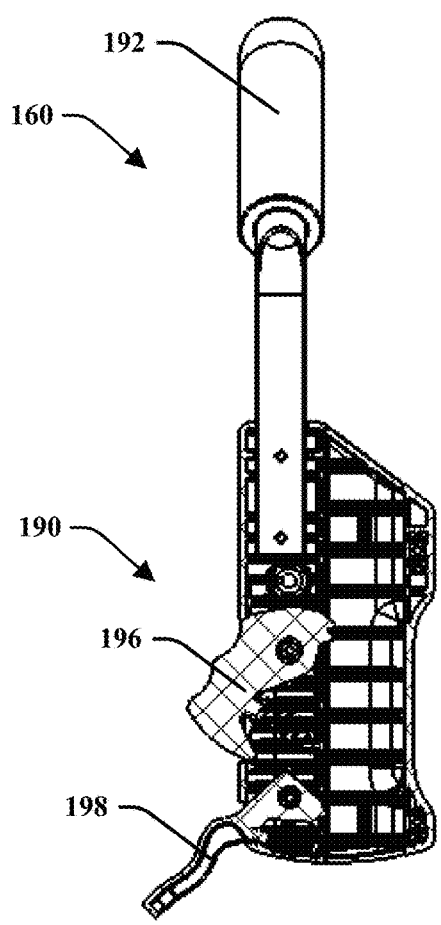
FIG. 9A is a cross sectional view of an embodiment of a hook member and engagement mechanism of the bike carrier assembly of the present disclosure.
Figure 9B:
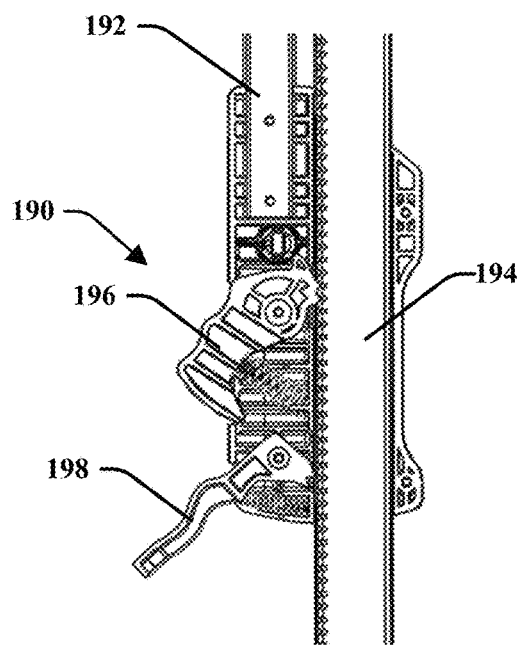
FIG. 9B is a partial cross sectional view of an embodiment of the engagement mechanism of the bike carrier assembly of the present disclosure.
Figure 9C:
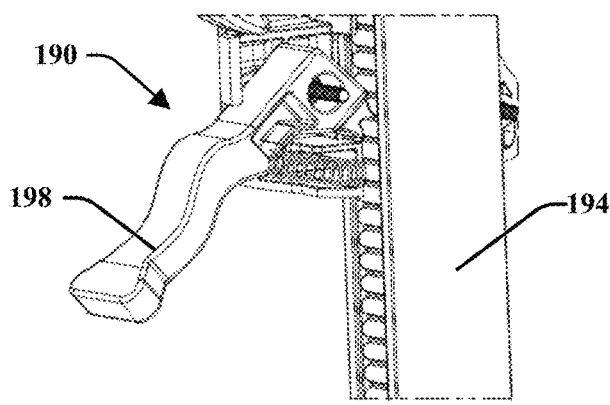
FIG. 9C is a partial perspective view of an embodiment of an engagement mechanism of the bike carrier assembly of the present disclosure.
Figure 9D:
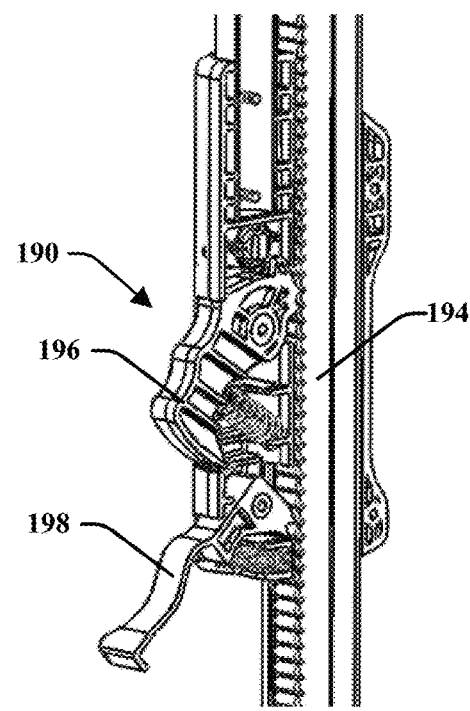
FIG. 9D is a partial cross sectional perspective view of an embodiment of an engagement mechanism of the bike carrier assembly of the present disclosure.

FIG. 7A is the hinge mechanism and the cargo carrier assembly in an up position. FIG. 7B is the hinge mechanism and the cargo carrier assembly in an unlocked position. FIG. 7C is the hinge mechanism and the cargo carrier assembly in a drop position. It should be noted that the hinge mechanism could be used with a variety of cargo assemblies and is not limited use with a bike carrier assembly.

Figure 10A:
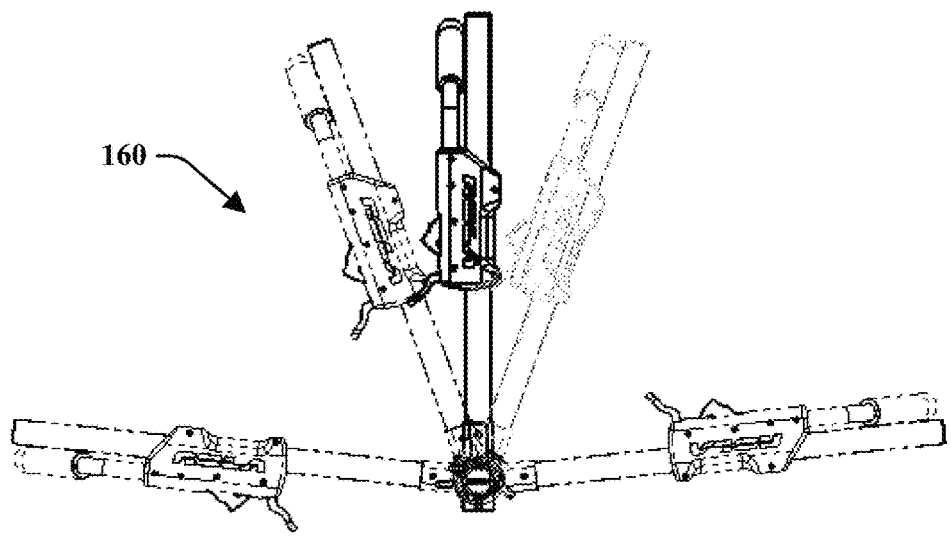
FIG. 10A is a partial phantom side view of an embodiment of the bike carrier assembly of the present disclosure.
Figure 10B:
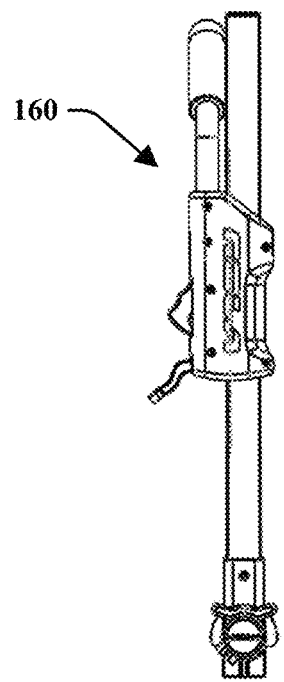
FIG. 10B is a side view of an embodiment of the engagement mechanism of the bike carrier assembly of the present disclosure.
Figure 10C:
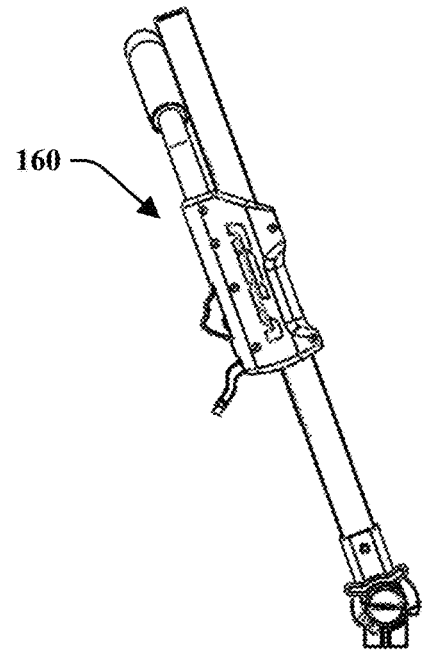
FIG. 10C is a side view of the engagement mechanism of the bike carrier assembly of the present disclosure.
Figure 10D:
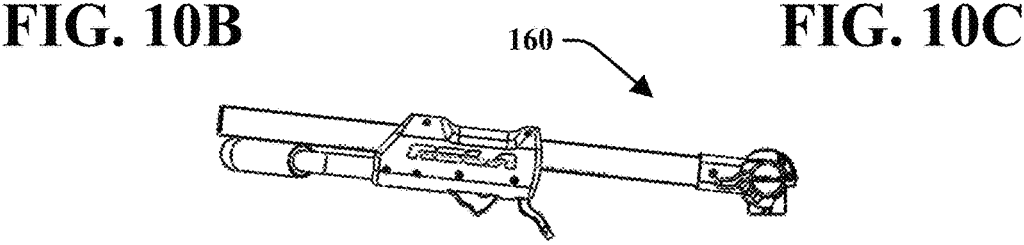
FIG. 10D is a side view of the engagement mechanism of the bike carrier assembly of the present disclosure.

FIGS. 8A, 8B, and 8C illustrate a connection member 150 for use with the bike carrier assembly 100. The connection member may be slidably connected along the rail 110 of the bike carrier assembly and allow a hook member 160 to be rotatably attached thereto. The hook member 160 may rotate relative to the connection member along an axis and may be selectively positioned in various locations as illustrated by FIG. 10A. The hook member 160 may include an inner profile 165 that is configured to slidingly align along a perimeter shape of the rail 110. A fastener 155 may be used to attach the connection member 150 to the rail 110. The hook member 160 may include a fastener member 170 that may selectively engage along a front profile 175 of the connection member 150. The fastener member 170 may include an elongated pin 180 that engages within the profile 175 and may lock the hook member 160 in place as the elongated pin 180 is positioned within various depressions 185 aligned within the front profile 175, i.e., it may selectively attached at a plurality of fixed positions. The fastener member 170 may include a bias member that biases the elongated pin 180 within the profile 175 and the depression 185, in which, a user may pull the fastener member 170 to rotate the hook member 160 relative to the connection member 150. In addition, or in the alternative, the fastener member 170 may include a camming mechanism to push the elongated pin 180 within the profile 175 and applicable depression 185.

FIGS. 9A, 9B, 9C, and 9D illustrate an embodiment of the hook member 160 with and engagement mechanism 190 for use to retain a bike on the bike carrier assembly of the present disclosure. The hook member 160 may include a hook 192 and an elongated arm 194 wherein the hook 192 may translate relative to the arm 194. The engagement mechanism 190 may include a toggle switch 196 and a lock switch 198. The toggle switch 196 may be engaged by the user to engage or disengage the hook 192 relative to the arm 194. The toggle switch 196 may include prongs that engage with teeth positioned along the arm 194. Once the hook 192 is positioned along the arm 194 in a desired location, the user may engage the lock switch 198 to terminate the hook in position along the arm 194 such that the hook may be abutted against a frame or wheel of a bike and reduce rattling of the bike. The lock switch 198 may include prongs that engage with teeth positioned along the arm 194. The toggle switch 196 and the lock switch 198 may include a bias member that puts a bias force to position the prongs against the teeth.

FIGS. 10A, 10B, 10C, and 10D illustrate the hook mechanism 160 in various positions relative to the connection member 150. This mechanism allows the hook mechanism 160 to engage either the frame of the bicycle attached or to the wheel of the bicycle attached. This allows a user the ability to choose to engage the bicycle with the bike carrier 100 such that the hook member 160 engages either of the wheel of the bicycle or the frame of the bicycle. In fact, the user may be able to engage a single bike by either of the frame or the wheel as desired by the user. This may also allow bikes of various configurations to engage the bike carrier 100, e.g., it may be able to engage small children's bikes, road bikes, mountain bikes, etc.

Figures 11A, 11B:
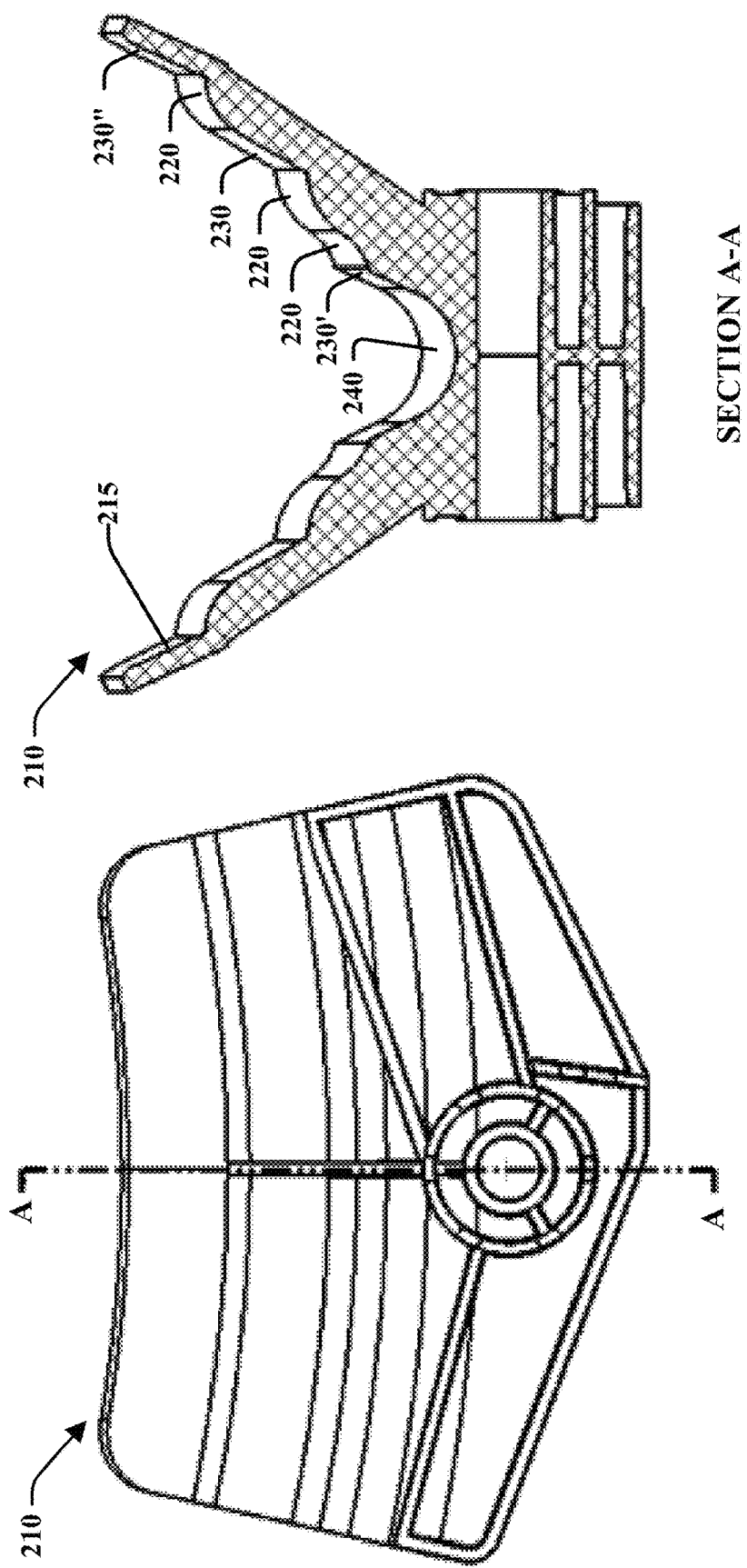
FIG. 11A is a side view of an embodiment of a wheel cradle of the bike carrier assembly of the present disclosure.
FIG. 11B is a cross sectional view of FIG. 11A.

FIGS. 11A and 11B illustrates a wheel cradle 210 of the bike carrier 100. Each bike carrier assembly 100 may include a front and a rear wheel cradle 210. The wheel cradle 210 may include an inner profile 215 having a plurality of ledges 220 and flats 230 to allow various sized wheels to be placed thereon. The inner profile shape 215 of the wheel cradle 210 may provide a user tactile feedback to indicate that a wheel of a bike has been firmly positioned within the profile 215 of the wheel cradle 210. The ledges 220 and flats 230 may be sloped, concave, convex or other shaped configuration and this disclosure is not limited. The wheel cradle 210 may be slidingly positioned along the rail 110 of the bike carrier and be rotationally attached thereto. Further, the wheel of the bike, depending on its size, may be able to sit on the flat 230 of one of the ledges 220. As the mating ledge of each of the ledges 220 is spaced a greater distance as they move up the wheel cradle 210, the larger tires may engage the flats 230 higher up. A small tire, such as a road bike tire, may engage the first flat 230' or even a U-shaped bottom portion 240. A bike having a fat tire may engage the uppermost flat 230". Regardless of which flat a tire engages the tire may rest on a generally flat surface of the flats 230.

Figure 12A:
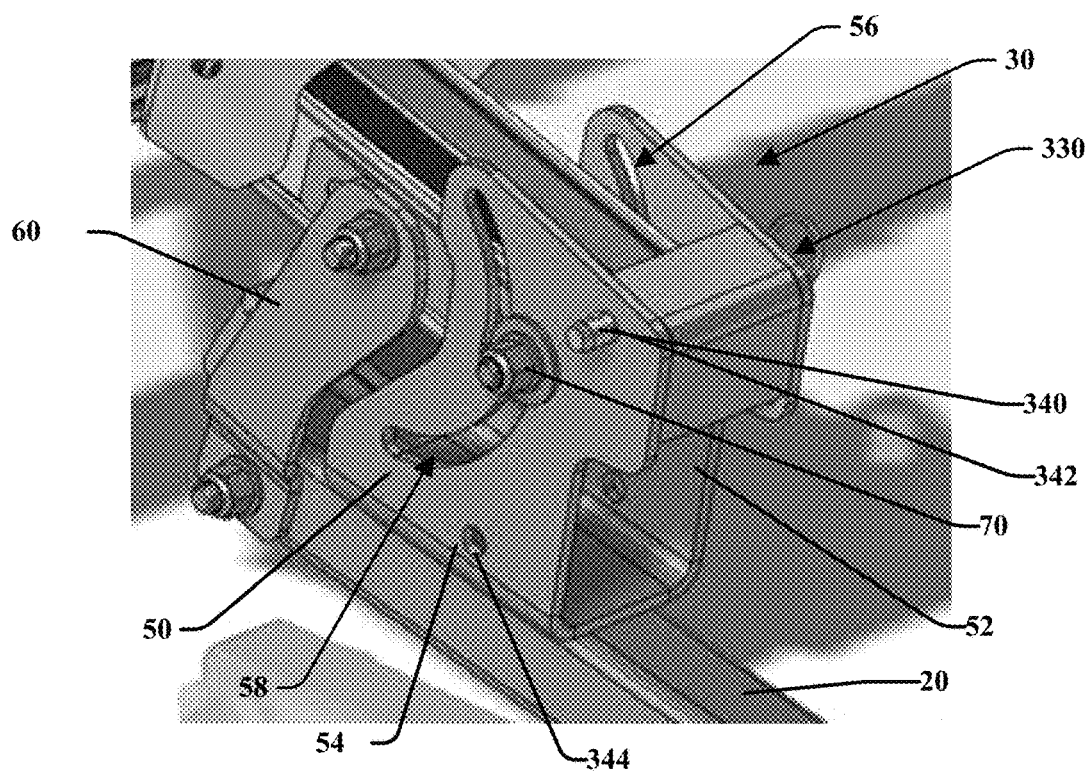
FIG. 12A is a perspective view of an embodiment of the hinge mechanism of the present disclosure.
Figure 12B:
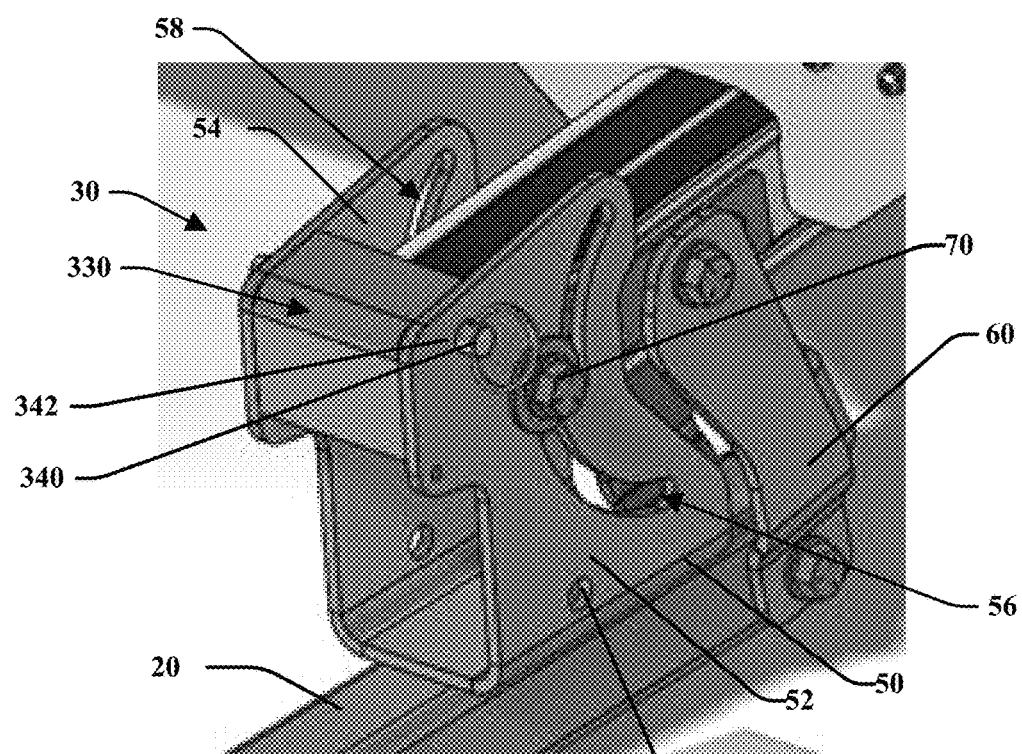
FIG. 12B is a perspective view of the embodiment of the hinge mechanism of FIG. 12A.
Figure 12C:
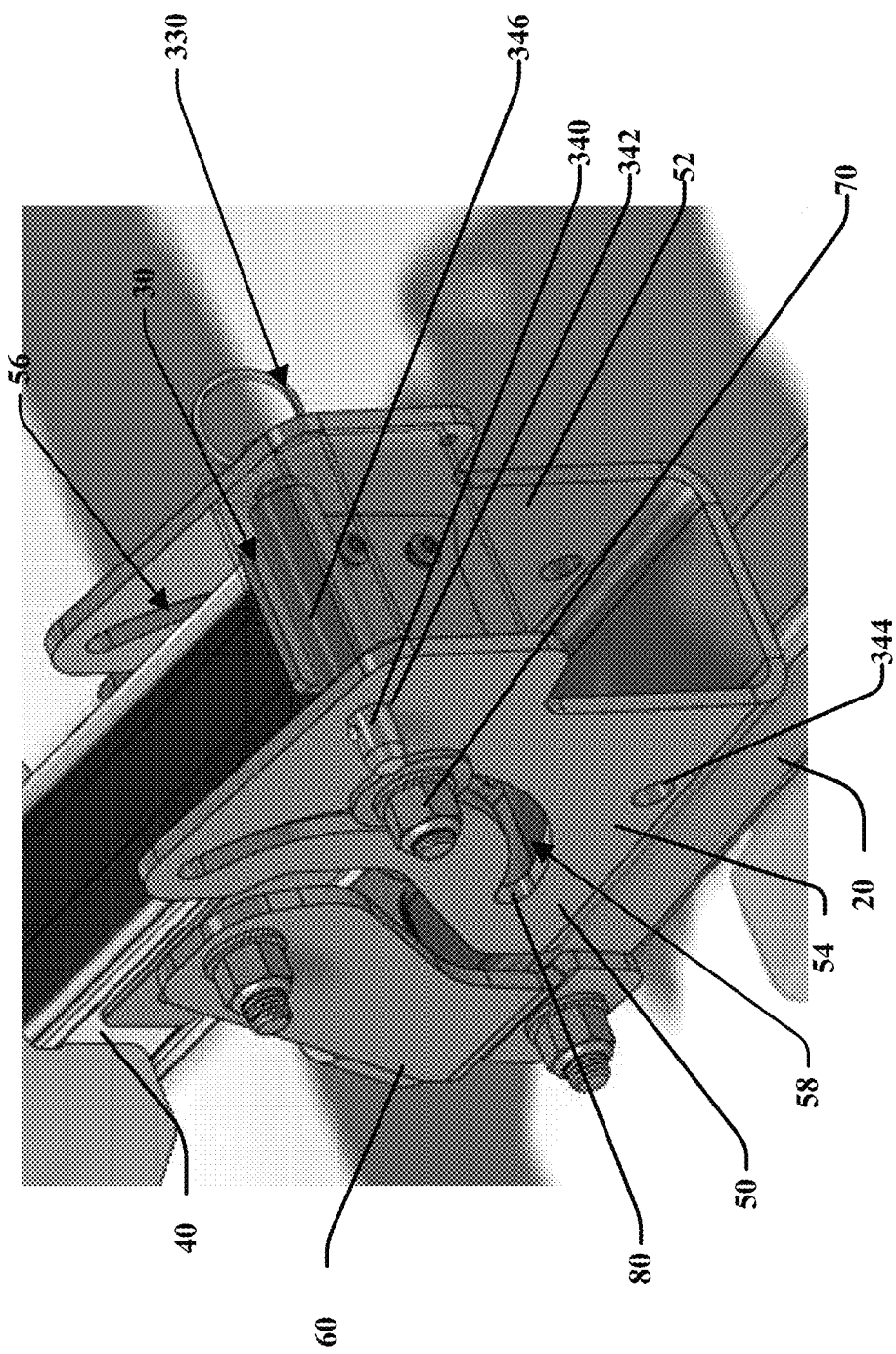
FIG. 12C is a perspective view of the embodiment of the hinge mechanism of FIG. 12A.

Further, as illustrated by FIGS. 12A, 12B, and 12C, the hinge mechanism 30 may include a locking member 330 for preventing the carrier member 40 from pivoting. The locking member 330 may include a pin 340 that may be selectively inserted within apertures 342, 344 along the hinge mechanism 30. The locking member 330, positioned in the locked configuration, may prevent the guide member 70 from pivoting towards the rotational groove 78. The locking member 330, positioned in the unlock configuration, may allow the guide member 70 to pivot towards the rotational groove 78. In one embodiment, the protrusion 73 and the locking member 330, in the locked configuration, may maintain the guide member 70 in the straight position groove 72. In another embodiment, the locking member 330, in the unlock configuration, allows the guide member 70 to translate between the straight and unlocked position groove 72, 74, as well as pivot between the straight and rotational grooves 72, 78.

A receiving member 346 may be attached to the distal end 42 of the carrier member 40 such that the pin 340 may be received within the receiving member 346 to place the assembly in the locked configuration. In one non-limiting embodiment, the receiving member 346 may be a cylindrical shaped sleeve welded to a plate that is fastened to the distal end 42 of the tube member 40. The pin 340 may be positioned though the apertures 342, 344 and the receiving member 346 to place the hinge mechanism in the locked configuration as the receiving member 346 is aligned with the respective apertures 342, 344. The receiving member 346 may be positioned within the hinge mechanism 30 and be between the plates 52, 54. A cover plate 348, as illustrated by FIGS. 12A and 12B may cover the receiving member 346. A user may toggle the hinge mechanism 30 between a locked or unlock configuration as the guide member 70 is positioned in the straight position groove 72 and the tube member 40 is in the straight position. The locking member 330 may be toggled between the locked and unlock configuration when the guide member 70 is in the upward position groove 80 and the tube member 40 is in the upward position. When aligned with aperture 342, the assembly may be locked in the straight position and when aligned with aperture 344, the assembly may be locked in the upward position.

Although the present embodiments have been illustrated in the accompanying drawings and described in the foregoing detailed description, it is to be understood that the bike carrier is not to be limited to just the embodiments disclosed, but that the bike carrier described herein is capable of numerous rearrangements, modifications and substitutions. The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

What is claimed is:

1. A cargo carrier assembly comprising:
    a draw bar;
    a carrier member to support cargo thereon;
    a hinge mechanism attached to the draw bar that includes a linkage device, the linkage device includes a first plate spaced from a second plate such that the carrier member is pivotally secured between the first plate and the second plate;
    a guide aperture that includes a contoured path to receive a guide member attached to the carrier member, the guide aperture includes a straight position groove, an unlock position groove, a drop position groove, and an upward position groove;
    wherein the carrier member is configured to be selectively pivoted between a straight position as the guide member is positioned in the straight position groove, an unlock position as the guide member is positioned in the unlock position groove, an up position as the guide member is positioned in the upward position groove, and a drop position as the guide member is positioned in the drop position groove.

2. The cargo carrier assembly of claim 1, wherein the hinge mechanism allows the carrier member to be selectively pivoted between the straight positon and the unlock position by translating the carrier member along a first direction.

3. The cargo carrier assembly of claim 1 further comprising at least one pivot arm that is rotatably attached to the draw bar at a first pivot point and is rotatably attached to the carrier member at a second pivot point.

4. The cargo carrier assembly of claim 3 wherein the at least one pivot arm includes a contoured surface and the linkage device includes a contoured surface wherein the contoured surface of the pivot arm nests with the contoured surface of the linkage device as the carrier member is pivoted.

5. The cargo carrier assembly of claim 4, wherein the contoured surface of the pivot arm and the contoured surface of the linkage device provide a pivotal range of motion that allows for stable movement during pivoting motion.

6. The cargo carrier assembly of claim 1 wherein the contoured path includes at least one guide aperture.

7. The cargo carrier assembly of claim 6, wherein the guide aperture includes a straight position groove, a drop position groove, a rotational groove, an unlock position groove, and an upward position groove wherein the grooves are arranged in a generally continuous shape.

8. The cargo carrier assembly of claim 7, wherein the guide aperture further comprises a protrusion positioned between the straight position groove and the unlock position groove wherein the guide member selectively overcomes the protrusion to pivot between the straight position groove and the unlock position groove.

9. The cargo carrier assembly of claim 1, wherein the hinge mechanism includes a locking feature to assist with locking the carrier member in a position relative to the draw bar.

10. The cargo carrier assembly of claim 9, wherein the locking feature is a pin selectively positioned in at least one aperture within the hinge mechanism.

11. The cargo carrier assembly of claim 1 wherein the draw bar is attachable to a hitch receiver of a vehicle.

12. The cargo carrier assembly of claim 1, wherein the cargo is a bike carrier assembly.

13. The cargo carrier assembly of claim 12, further comprising a support arm to support additional bike carriers in a generally scalable arrangement such that a plurality of bike carriers can extend from the hinge mechanism and pivot between the upward position, the straight position, and the lower position.

14. A hinge mechanism for attaching a cargo accessory to a vehicle, the hinge mechanism comprising:
   a linkage device selectively attachable to a vehicle,
   a carrier member having a draw bar pivotally attached to the linkage device, wherein the cargo accessory carrying member is pivotable between a straight position, an unlock position, an upward position, and a drop position;
   at least one pivot arm that is rotatably attached to the draw bar at a first pivot point and is rotatably attached to the carrier member at a second pivot point wherein the at least one pivot arm includes a contoured surface and the linkage device includes a contoured surface wherein the contoured surface of the pivot arm nests with the contoured surface of the linkage device as the carrier member is pivoted;
   wherein the contoured surface of the pivot arm and the contoured surface of the linkage device provide a pivotal range of motion that allows for stable movement during pivoting motion.

15. The hinge mechanism of claim 14, wherein the wherein the carrier member includes a guide member and the linkage device includes guide apertures wherein the guide member may be selectively positioned within the guide apertures permitting pivoting of the cargo accessory carrying member relative to the linkage device.

16. The hinge mechanism of claim 14, wherein the guide aperture includes a straight position groove, a drop position groove, a rotational groove, an unlock position groove, and an upward position groove wherein the grooves are arranged in a generally continuous shape.

17. The hinge mechanism of claim 14, wherein the carrier member is a platform type bike carrier assembly.

18. The hinge mechanism of claim 17, wherein the guide aperture further comprises a notch to receive a portion of the guide member that is positioned between the straight position groove and the unlock position groove to allow the guide member and carrier member to be maintained in the straight position.

19. The hinge mechanism of claim 14 further comprising a locking member to toggle the hinge mechanism between a locked configuration and an unlocked configuration.

* * * * *